US010664406B2

(12) United States Patent
Riedy et al.

(10) Patent No.: US 10,664,406 B2
(45) Date of Patent: May 26, 2020

(54) COORDINATED UTILIZATION OF PARALLEL PATHS TO IMPROVE EFFICIENCY

(71) Applicant: International Business Machines Corporation, Armonk, NY (US)

(72) Inventors: Dale F. Riedy, Poughkeepsie, NY (US); Peter G. Sutton, Lagrangeville, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 15/464,827

(22) Filed: Mar. 21, 2017

(65) Prior Publication Data
US 2018/0275884 A1 Sep. 27, 2018

(51) Int. Cl.
*G06F 3/06* (2006.01)
*G06F 12/0868* (2016.01)
(Continued)

(52) U.S. Cl.
CPC .......... *G06F 12/0875* (2013.01); *G06F 3/065* (2013.01); *G06F 3/067* (2013.01);
(Continued)

(58) Field of Classification Search
CPC ...... G06F 3/0608; G06F 3/0619; G06F 3/065; G06F 3/067; G06F 12/0875;
(Continued)

(56) References Cited

U.S. PATENT DOCUMENTS 4,718,039 A * 1/1988 Aichelmann, Jr. ......................... G06F 12/0853 365/219
5,649,124 A * 7/1997 Kreidl ................. G06F 13/4045 710/305

(Continued)

OTHER PUBLICATIONS

Schindler, Jiri, "Matching Application Access Patterns to Storage Device Characteristics", Dept. of Electrical and Computer Engineering, Carnegie Mellon University, Submitted in partial fulfillment of the requirements for the degree of Doctor of Philosophy, May 2004, available at: http://repository.cmu.edu/cgi/viewcontent.cgi?article=1069&context=pdl.

*Primary Examiner* — Kaushikkumar M Patel
*Assistant Examiner* — Andrew J Cheong
(74) *Attorney, Agent, or Firm* — Nelson and Nelson; Daniel P. Nelson; Alexis V. Nelson

(57) ABSTRACT

A method for utilizing parallel paths of differing performance to improve efficiency is disclosed. In one embodiment, such a method includes transmitting, over a faster path, a first command to perform first actions intended to improve efficiency of second actions associated with a second command. The method transmits, over a slower path in parallel with the faster path, the second command. Alternatively, a method for utilizing parallel paths of differing performance to improve efficiency includes receiving, over a faster path, a first command to perform first actions intended to improve efficiency of second actions associated with a second command. The method executes the first command to perform the first actions. The method receives, over a slower path in parallel with the faster path, the second command and executes the second command to perform the second actions. Corresponding systems and computer program products are also disclosed.

15 Claims, 6 Drawing Sheets

(51) Int. Cl.
*G06F 12/0875* (2016.01)
*G06F 12/0862* (2016.01)

(52) U.S. Cl.
CPC .......... *G06F 3/0613* (2013.01); *G06F 3/0635* (2013.01); *G06F 12/0862* (2013.01); *G06F 12/0868* (2013.01); *G06F 2212/1024* (2013.01); *G06F 2212/154* (2013.01); *G06F 2212/313* (2013.01); *G06F 2212/6028* (2013.01)

(58) Field of Classification Search
CPC ......... G06F 2212/452; G06F 2212/602; G06F 2212/6028
See application file for complete search history.

(56) References Cited

U.S. PATENT DOCUMENTS

| | | |
|---|---|---|
| 8,261,005 B2 | 9/2012 | Flynn et al. |
| 8,707,308 B1 | 4/2014 | Naamad et al. |
| 9,269,438 B2 | 2/2016 | Nachimuthu et al. |
| 9,582,603 B1* | 2/2017 | Acharya ............. H04L 67/1097 |
| 2007/0233985 A1* | 10/2007 | Malhotra ............. G06F 3/0605 711/163 |
| 2008/0126564 A1* | 5/2008 | Wilkinson ............. H04L 12/64 709/242 |
| 2008/0165837 A1* | 7/2008 | Cranford .......... G01R 31/31715 375/224 |
| 2009/0292854 A1* | 11/2009 | Khoo ................. G06F 13/4027 710/312 |
| 2013/0182553 A1* | 7/2013 | Sugibuchi ............. H04L 1/0061 370/216 |
| 2018/0145894 A1* | 5/2018 | Zhou ...................... G06F 13/20 |

\* cited by examiner

COORDINATED UTILIZATION OF PARALLEL PATHS TO IMPROVE EFFICIENCY

BACKGROUND

Field of the Invention

This invention relates to systems and methods for coordinating utilization of parallel paths of differing I/O performance to improve efficiency.

Background of the Invention

To increase performance and reliability, a cache may be implemented in data storage systems to buffer I/O to slower storage media such as spinning magnetic disks or solid state drives. Because DRAM used to implement cache is substantially faster then spinning magnetic disks, cache may significantly improve the I/O performance of a storage system. Specifically, reading from or writing to a cache is typically cheaper (in terms of access time and/or resource utilization) than accessing other memory or storage devices. Once data is stored in cache, it may be accessed in cache instead of re-fetching and/or re-computing the data, saving both time and resources.

Storage systems typically manage the contents of a local DRAM cache by examining a pattern of I/O requests and implementing algorithms to intelligently pre-stage data to cache, keep frequently referenced data resident in cache, and cast out data that no longer belongs in cache. Such storage systems may also examine in-band hints received from applications, middleware, and operating systems to help the storage systems make intelligent decisions. In-band hints indicating how cache should be managed may, for example, specify if a read request is for data that is to be accessed sequentially or randomly. In certain cases, hundreds of microseconds may be required to transmit the in-band cache hint over a conventional communication path between a host system and storage system. Additional hundreds or, in the case of spinning disks, thousands of microseconds may be needed to load the required data into cache so that it can be delivered to a waiting application.

In view of the foregoing, what are needed are systems and methods to accelerate pre-staging of data into storage system cache so that the data may be ready and waiting when it is needed. Ideally, similar systems and methods may be used spur efficiency gains with other types of operations occurring on a storage system.

SUMMARY

The invention has been developed in response to the present state of the art and, in particular, in response to the problems and needs in the art that have not yet been fully solved by currently available systems and methods. Accordingly, systems and methods are disclosed to utilize parallel paths of differing performance to improve efficiency. The features and advantages of the invention will become more fully apparent from the following description and appended claims, or may be learned by practice of the invention as set forth hereinafter.

Consistent with the foregoing, a method for utilizing parallel paths of differing performance to improve efficiency is disclosed. In one embodiment, such a method includes transmitting, over a faster path, a first command to perform first actions intended to improve efficiency of second actions associated with a second command. The method transmits, over a slower path in parallel with the faster path, the second command.

Alternatively, a method for utilizing parallel paths of differing performance to improve efficiency includes receiving, over a faster path, a first command to perform first actions intended to improve efficiency of second actions associated with a second command. The method executes the first command to perform the first actions. The method receives, over a slower path in parallel with the faster path, the second command and executes the second command to perform the second actions.

Corresponding systems and computer program products are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
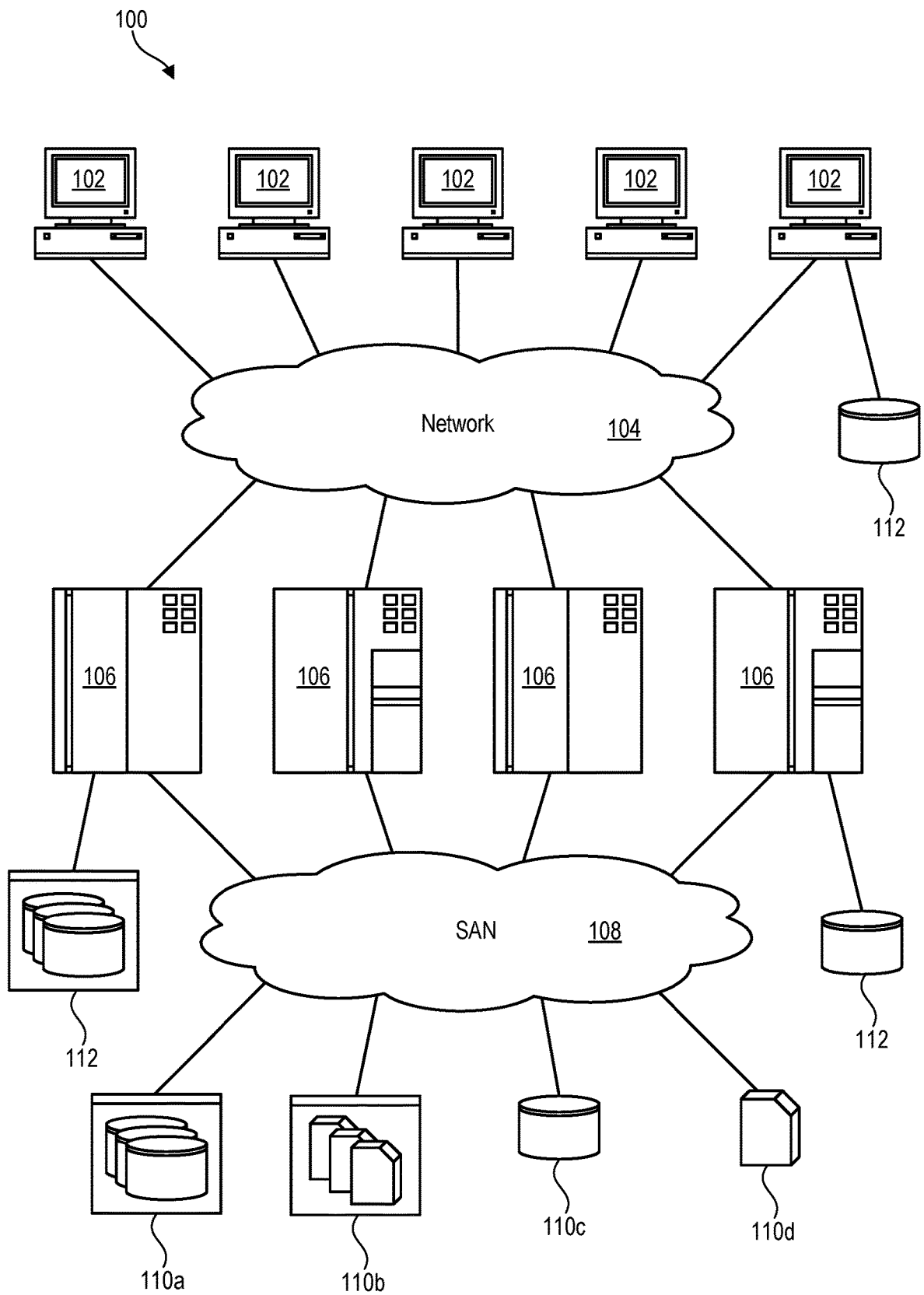
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the systems and methods disclosed herein.

Figure 2:
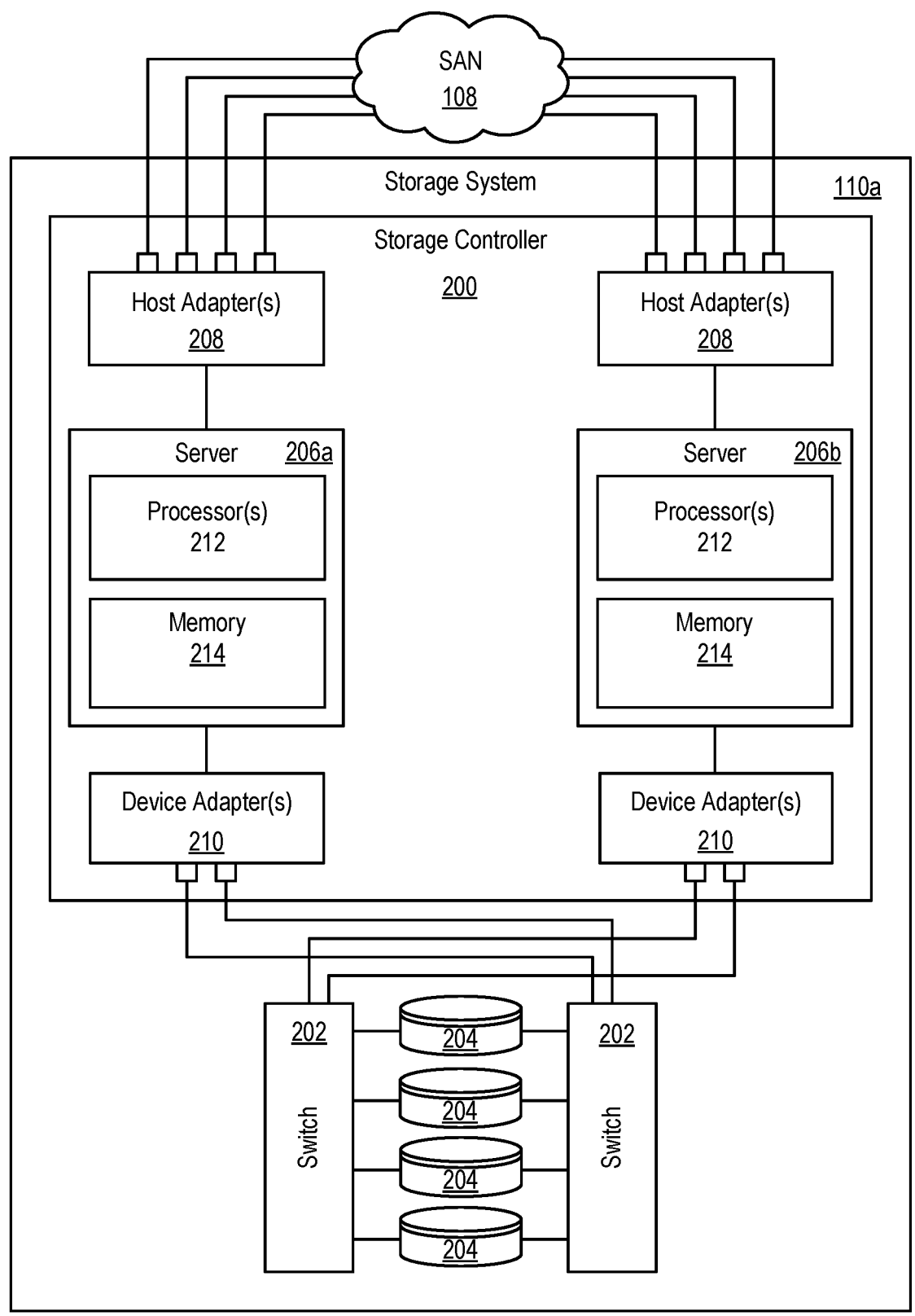
FIG. 2 is a high-level block diagram showing an example of a storage system containing an array of storage drives.

Referring to FIG. 2, one embodiment of a storage system 110a containing an array of hard-disk drives 204 and/or solid-state drives 204 is illustrated. The internal components of the storage system 110a are shown since functionality in accordance with the invention may be implemented within such a storage system 110a. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. These software modules may manage all read and write requests to logical volumes in the storage devices 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
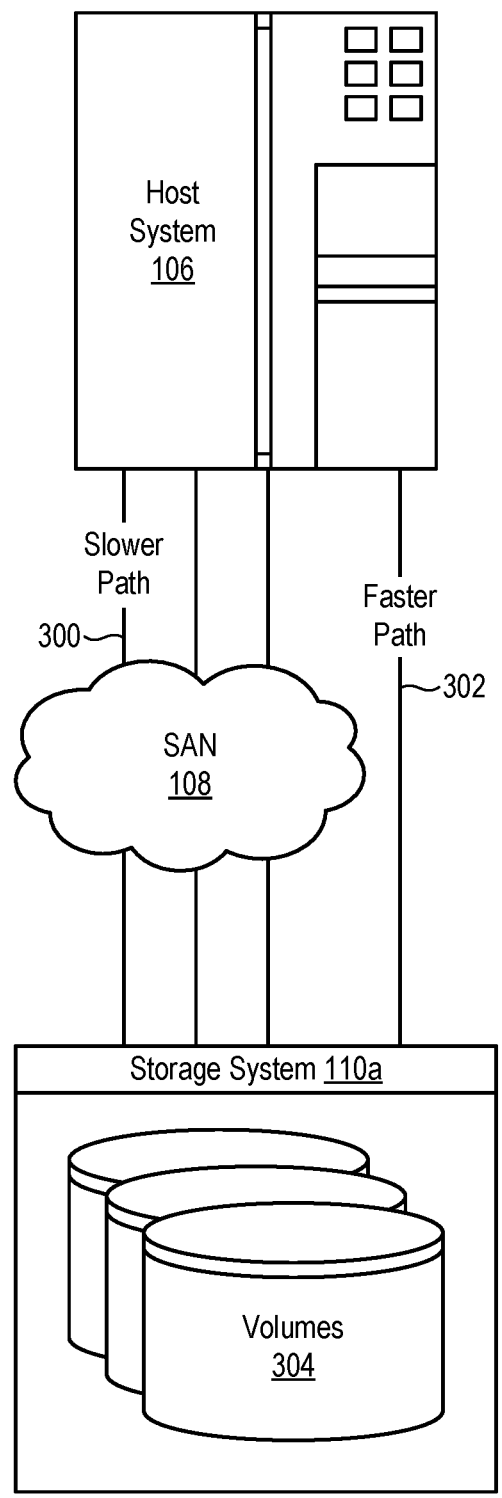
FIG. 3 is a high-level block diagram showing a faster path and slower path between a host system and storage system.

Referring to FIG. 3, in certain embodiments in accordance with the invention, other communication paths 302 may be established between a host system 106 and storage system 110a, other than communications paths 300 through a storage-area-network 108. In certain embodiments, these additional communication paths may bypass the storage-area-network 108 to provide a substantially direct link between the host system 106 and storage system 110a. This may provide faster communication than would otherwise be possible through the storage-area-network 108. Paths 300 through the storage-area-network 108, by contrast, may need to traverse switches and other networking hardware between the host system 106 and storage system 110a, which may slow down communication. In certain embodiments, conventional Fibre Connectivity (FICON) channels may be used to communicate through the storage-area-network 108 (i.e., the slower path 300), whereas faster peripheral component interconnect express (PCIe) interfaces on the host system 106 and/or storage system 110a may be used to implement the faster path 302.

In certain embodiments, the faster communication path 302 may enable the host system 106 to use a synchronous I/O access method when accessing data in the storage system 110a. The synchronous I/O access method may cause a software thread to be blocked while waiting for the I/O to complete, but avoids context switches and interrupts associated with slower asynchronous I/O access methods. Synchronous I/O access methods typically work well when storage resources are locally attached with minimal access latency, but as access times increase, non-productive processor overhead associated with waiting for an I/O to complete becomes unacceptable, particularly for large multi-processing servers. The current state of the art for server access to SAN storage, with its associated protocol overhead, is to use asynchronous I/O access methods. Asynchronous I/O enables processors to turn their attention to performing other tasks while waiting for I/Os to complete. An interrupt may notify a processor when an I/O is complete so it can switch back to the task that needed the I/O in the first place. The large variation in access times, and even the minimum access times, of SAN storage using current communication protocols such as Fibre-Channel make synchronous I/O access unacceptable in most cases.

Figure 4:
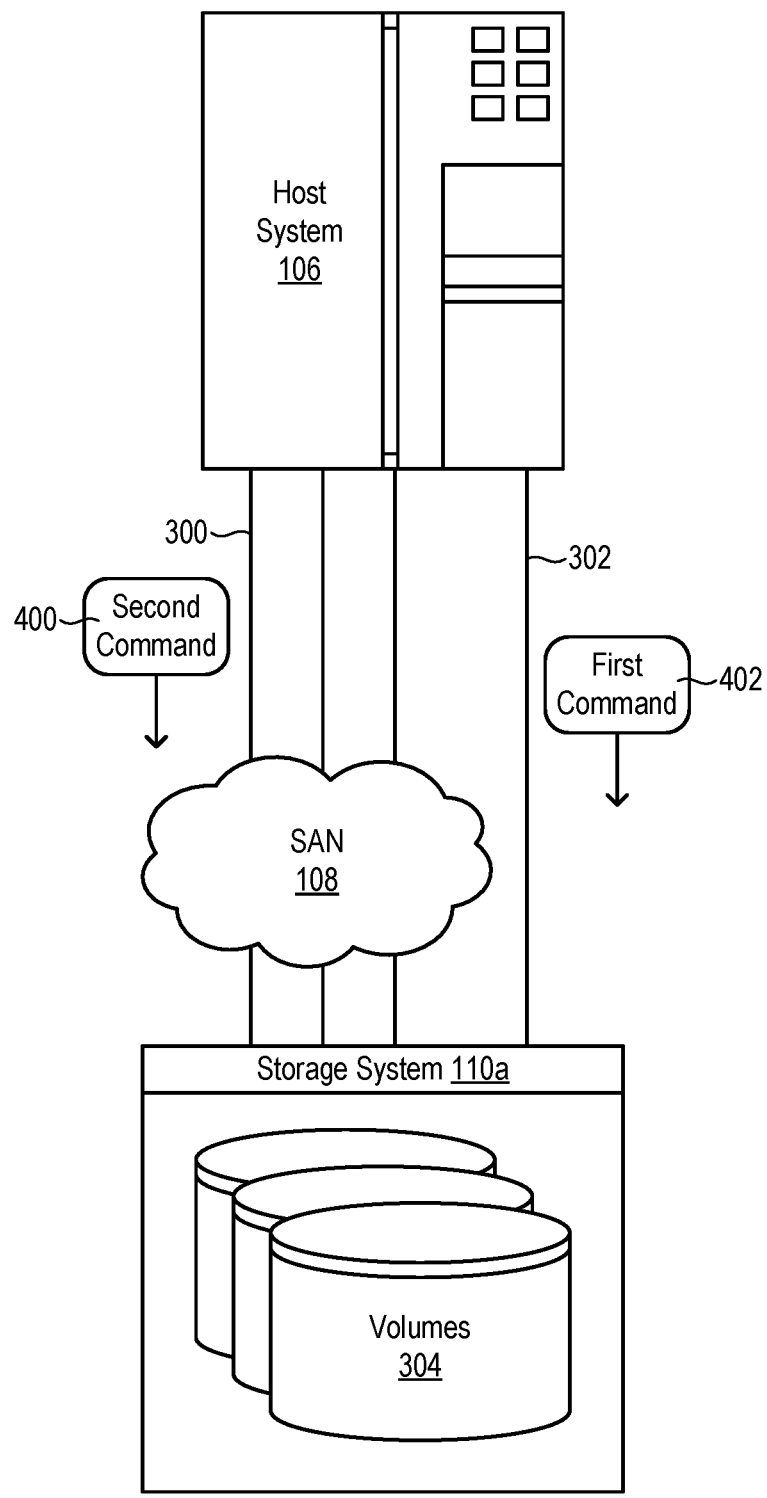
FIG. 4 shows utilization of the faster path and slower path to improve efficiency, particularly showing sending a first command over the faster path to influence behavior or performance of a second command sent over the slower path.

Referring to FIG. 4, in certain embodiments in accordance with the invention, the faster path 302 may be used in coordination with the slower path 300 to improve the efficiency and performance of commands transmitted over the slower path 300. In certain cases, commands normally transmitted over a slower in-band path 300 may be divided into separate requests that are transmitted down different paths 300, 302 of differing I/O performance. This may significantly improve the performance of commands transmitted down the slower in-band path 300.

As shown in FIG. 4, a method in accordance with the invention may involve transmitting a first command 402 over the faster path 302 and executing the first command 402 on the storage system 110a to perform first actions. These first actions may be selected to improve the efficiency, performance, or behavior of second actions associated with a second command 400. The method transmits the second command 400 over the slower path 300 (which is in parallel with the faster path 302) to perform the second actions that take advantage of or utilize the first actions.

In certain embodiments, the second command 400 is transmitted at substantially the same time as the first command 402. In other embodiments, the second command 400 is transmitted some time after the first command 402. Because the faster path 302 provides higher speed transmission than the slower path 300, the first command 402 will reach the storage system 110a before the second command 400 to perform the first actions in preparation to receive and execute the second command 400. In certain embodiments, coordinated use of the faster path 302 and slower path 300 as shown in FIG. 4 may save hundreds of microseconds in transmitting and executing the second command 400. Two exemplary use cases of the generalized method shown in FIG. 4 are provided in FIGS. 5 and 6.

Figure 5:
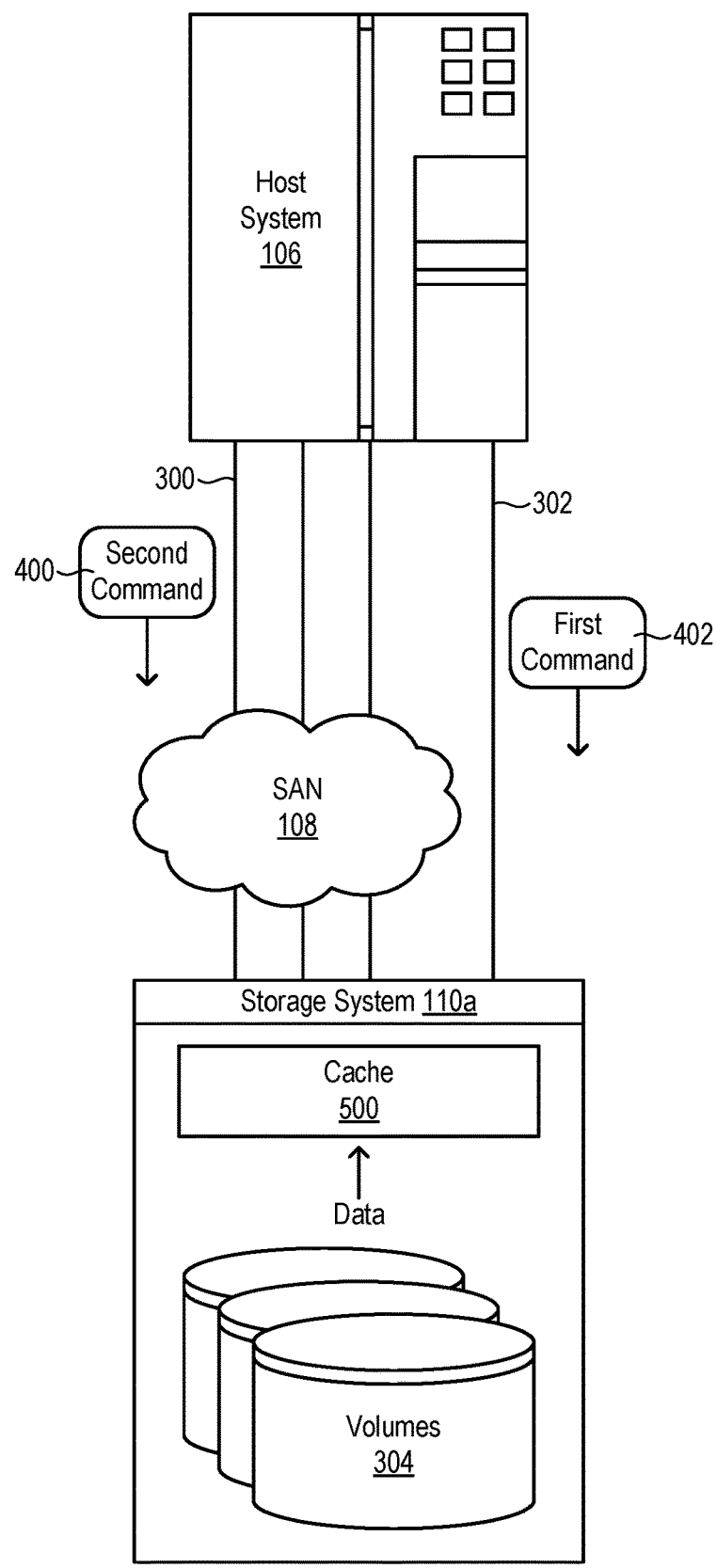
FIG. 5 shows sending a first command over the faster path to populate a cache in preparation to execute an I/O request sent over the slower path.

Referring to FIG. 5, in certain embodiments in accordance with the invention, an I/O request that includes an in-band cache hint may be divided into a first command 402 and second command 400 for transmission over separate paths 300, 302 of differing I/O performance. More specifically, the first command 402 may be a cache hint 402 or command 402 to pre-stage desired data into cache 500. In certain embodiments the cache hint 402 may instruct the storage system 110a to sequentially pre-fetch certain data from volumes 304 (e.g., disk volumes 304) into the cache 500, starting from a specified data element. The second command 400 (or commands 400) may be configured to access (i.e., read from or write to) the data in the cache 500. The cache hint 402 may also instruct the storage system 110a to, once the data is accessed, demote the data from the cache 500 immediately, demote the data in the cache 500 in accordance with a least recently used (LRU) algorithm, or demote the data from the cache 500 in accordance with some other demotion algorithm.

In other embodiments, the cache hint 402 may provide a list of non-contiguous data elements or ranges of data elements to be pre-staged to the cache 500 for access in the near future. The second command 400 or commands 400 may access these storage elements in the cache 500. Because the first command 402 arrives at the storage system 110a prior to the second command 400, the storage system 110a may already be working to move desired data into cache 500 prior to or at the time of arrival of the second command 400 or commands 400. This may cause the second command 400 or commands 400 to complete substantially faster, perhaps hundreds or thousands of microseconds faster, since needed data will already be in cache 500 or be in the process of being transferred to cache 500 when the second command 400 arrives and is executed. The process illustrated in FIG. 5 eliminates or reduces the need for a storage system 110a to learn I/O patterns from the host system 106 and populate the cache 500 accordingly.

In other embodiments, a host system 106 or operating system on the host system 106 may be configured to use the faster path 302 to improve a cache hit ratio. For example, the host system 106 may be configured to detect when a cache hit ratio falls below a selected threshold for a given workload and, in response, send a cache hint 402 over the faster path 302 with instructions regarding how to populate the cache 500 in order to raise the cache hit ratio. The storage system 110a may receive this cache hint 402 and populate the cache 500 accordingly.

Figure 6:
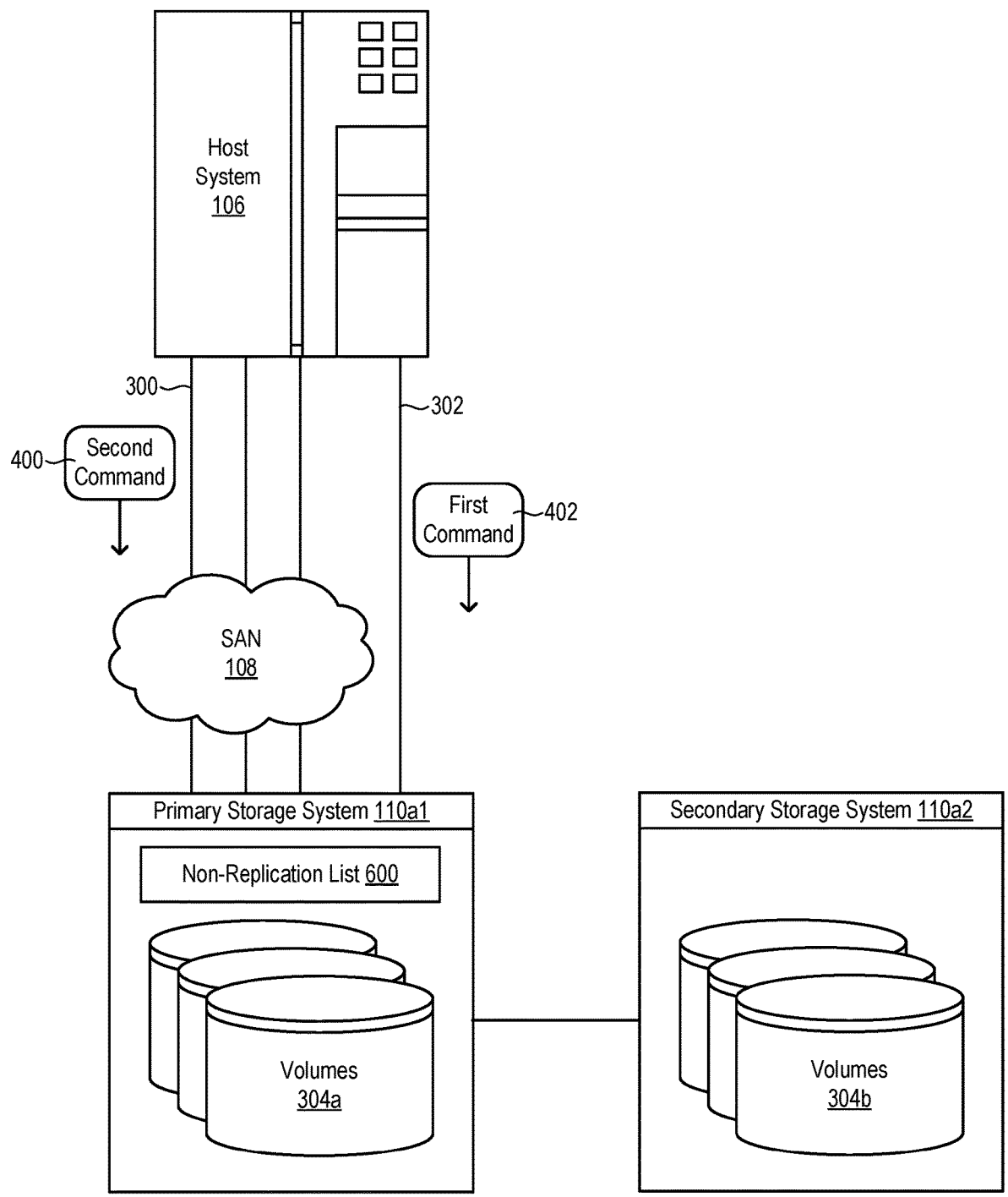
FIG. 6 shows sending a first command over the faster path to specify what data is replicated from a primary storage system to a secondary storage system.

Referring to FIG. 6, in another example, the method illustrated in FIG. 4 may be utilized in a data replication environment such as that illustrated in FIG. 6. As shown, data that is written to a primary storage system 110a1 may be replicated to a secondary storage system 110a2 for redundancy or disaster recovery purposes. The data replication environment may operate in a synchronous or asynchronous manner as known to those of skill in the art.

In certain cases, it may be desirable to disable data replication functionality for certain data that is written to the primary storage system 110a1. For example, temporary work files may be of limited importance or value and may not require a redundant copy on the secondary storage system 110a2. Disabling replication for these work files may preserve bandwidth for other data travelling between the primary storage system 110a1 and secondary storage system 110a2. In certain cases, a non-replication list 600 may be established on the primary storage system 110a1 to indicate which data or data elements should not be replicated to the secondary storage system 110a2. When the primary storage system 110a1 receives data for writing to primary volumes 304a, data replication functionality may reference the non-replication list 600 to determine if the data needs to be replicated to the secondary storage system 110a2. If the data is referenced in the list 600, the data replication functionality may not replicate the data to the secondary storage system 110a2.

In certain embodiments, systems and methods in accordance with the invention may utilize the faster path 302 to update the non-replication list 600 prior to data arriving at the primary storage system 110a1 over the slower path 300. That is, a first command 402 may be transmitted to the primary storage system 110a1 over the faster path 302. The primary storage system 110a1 may execute the first command 402 to update the non-replication list 600. A second command 400 or commands 400 may be sent over the slower path 300 to write data to the primary storage system 110a1. Upon receiving the command 400 or commands 400, the data replication functionality may analyze the non-replication list 600 to determine if the data should be replicated to the secondary storage system 110a2. If the data is listed in the non-replication list 600, the data replication functionality may not replicate the data.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for utilizing parallel paths of differing I/O performance to improve efficiency, the method comprising:
transmitting, over a faster path that bypasses a storage area network, a first command to perform first actions intended to improve efficiency of second actions associated with a second command; and
transmitting, over a slower path that passes through the storage area network, the second command, wherein the faster path is physically arranged in parallel with the slower path and the faster path supports higher speed transmission than the slower path.

2. The method of claim 1, wherein the first command is configured to populate a cache with data.

3. The method of claim 2, wherein the second command is configured to operate on the data in the cache.

4. A computer program product for utilizing parallel paths of differing I/O performance to improve efficiency, the computer program product comprising a computer-readable storage medium having computer-usable program code embodied therein, the computer-usable program code configured to perform the following when executed by at least one processor:

transmit, over a faster path that bypasses a storage area network, a first command to perform first actions intended to improve efficiency of second actions associated with a second command; and transmit, over a slower path that passes through the storage area network, the second command, wherein the faster path is physically arranged in parallel with the slower path and the faster path supports higher speed transmission than the slower path.

5. The computer program product of claim 4, wherein the first command is configured to populate a cache with data.

6. The computer program product of claim 5, wherein the second command is configured to operate on the data in the cache.

7. A system for utilizing parallel paths of differing I/O performance to improve efficiency, the system comprising:

at least one processor;

at least one memory device operably coupled to the at least one processor and storing instructions for execution on the at least one processor, the instructions causing the at least one processor to:

transmit, over a faster path that bypasses a storage area network, a first command to perform first actions intended to improve efficiency of second actions associated with a second command; and transmit, over a slower path that passes through the storage area network, the second command, wherein the faster path is physically arranged in parallel with the slower path and the faster path supports higher speed transmission than the slower path.

8. The system of claim 7, wherein the first command is configured to populate a cache with data.

9. The system of claim 8, wherein the second command is configured to operate on the data in the cache.

10. A method for utilizing parallel paths of differing I/O performance to improve efficiency, the method comprising:

receiving, over a faster path that bypasses a storage area network, a first command to perform first actions intended to improve efficiency of second actions associated with a second command;

executing the first command to perform the first actions;

receiving, over a slower path that passes through the storage area network, the second command, wherein the faster path is physically arranged in parallel with the slower path and the faster path supports higher speed transmission than the slower path; and executing the second command to perform the second actions.

11. The method of claim 10, wherein the first command is configured to populate a cache with data.

12. The method of claim 11, wherein the second command is configured to operate on the data in the cache.

13. A system for utilizing parallel paths of differing I/O performance to improve efficiency, the system comprising:

at least one processor;

at least one memory device operably coupled to the at least one processor and storing instructions for execution on the at least one processor, the instructions causing the at least one processor to:

receive, over a faster path that bypasses a storage area network, a first command to perform first actions intended to improve efficiency of second actions associated with a second command;

execute the first command to perform the first actions;

receive, over a slower path that passes through the storage area network, the second command, wherein the faster path is physically arranged in parallel with the slower path and the faster path supports higher speed transmission than the slower path; and execute the second command to perform the second actions.

14. The system of claim 13, wherein the first command is configured to populate a cache with data.

15. The system of claim 14, wherein the second command is configured to operate on the data in the cache.

\* \* \* \* \*